United States Patent [19]
Carlson et al.

[11] 3,852,154
[45] Dec. 3, 1974

[54] NUCLEAR REACTOR SPACER DEVICE

[75] Inventors: Roy C. Carlson, Richland; Loyd L. King, Benton City; George A. Sofer, Richland, all of Wash.

[73] Assignee: Jersey Nuclear Company, Bellevue, Wash.

[22] Filed: Feb. 4, 1972

[21] Appl. No.: 223,528

[52] U.S. Cl. ................................. 176/78
[51] Int. Cl. ............................. G21c 3/34
[58] Field of Search ................. 176/76, 78

[56] References Cited
UNITED STATES PATENTS

| | | | |
|---|---|---|---|
| 3,301,764 | 1/1967 | Timbs et al. | 176/78 |
| 3,377,254 | 4/1968 | Frisch | 176/78 |
| 3,654,077 | 4/1972 | Lass et al. | 176/78 |
| 3,664,924 | 5/1972 | Krawiec | 176/78 |

FOREIGN PATENTS OR APPLICATIONS

| 1,933,319 | 4/1970 | Germany | 176/78 |
|---|---|---|---|
| 2,005,061 | 9/1970 | Germany | 176/78 |

*Primary Examiner*—Harvey E. Behrend

[57] ABSTRACT

A nuclear reactor fuel element spacer device for holding fuel elements in relatively fixed positions in a nuclear reactor core is disclosed which comprises, in combination, structurally improved peripheral support band, intersecting support strips connected to the peripheral support band and spring assemblies held in the desired positions by the intersecting support strips.

13 Claims, 12 Drawing Figures

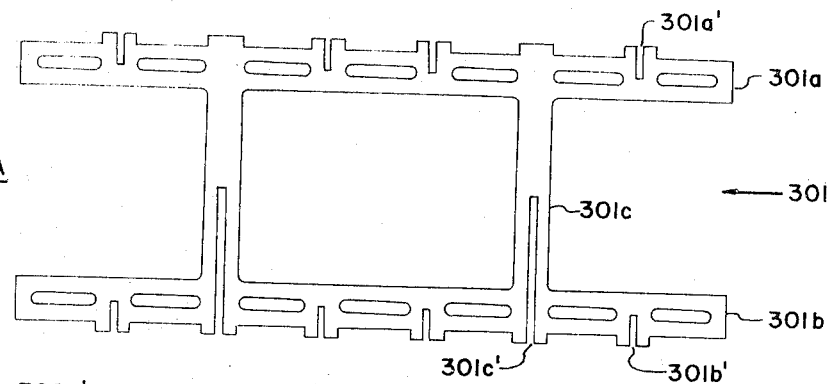
FIGURE 5A
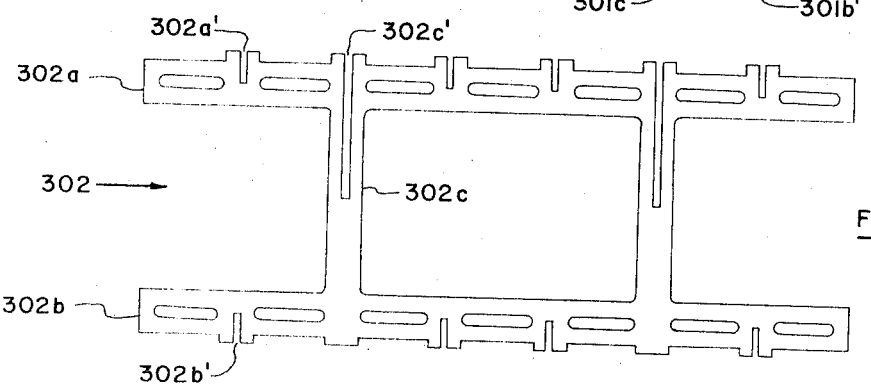
FIGURE 5B
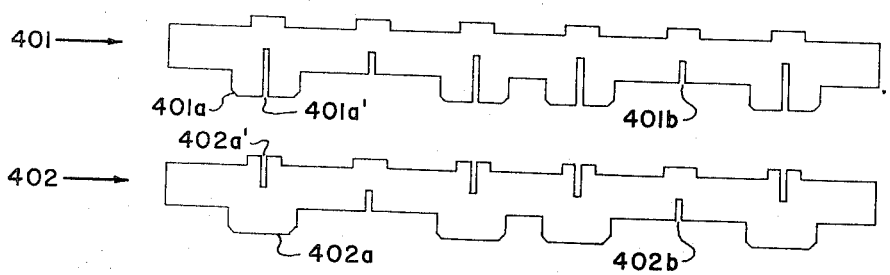
FIGURE 5C
FIGURE 5D

NUCLEAR REACTOR SPACER DEVICE

BACKGROUND OF THE INVENTION

The present invention relates broadly to nuclear reactions and systems, and more particularly to a nuclear reactor fuel element spacer device.

In designing a nuclear power reactor fuel core it is exceedingly important that the position of the fissionable fuel material be maintained in specific fixed spatial relationship within the core in order to achieve optimum heat generation over extended periods of time. If this spatial relationship is not maintained, then satisfactory flow of coolant about the fissionable fuel material will not be achieved. This will result in "hot spots" and poor heat transfer efficiency. Thus for a given fuel burnup rate less electrical power output will be achieved in the reactor.

In an effort to overcome these problems, considerable experimental design work has been undertaken to insure the proper spatial distribution of the fuel materials. In a typical modern design, the fuel material is encased in long, thin corrosion-resistant tubings that are arranged parallel to one another at fixed distances and held in position by structural means called "spacers." Exemplary of the spacer designs previously used are the ones described in U.S. Pat. Nos. 3,185,632, 3,255,090, 3,350,275, 3,379,617, 3,380,890, 3,398,053, 3,405,033, 3,423,287, 3,442,763, 3,510,397 and 3,536,583, as well as U.S. Pat. No. 3,654,077 and 3,664,924.

While each of the prior art spacer designs do maintain the spatial integrity of the fuel elements to varying degrees, each is plagued with one or more problems that makes their use less than most desirable. One such problem is the mechanical stability of the spacer. The spacer must be designed to withstand not only high temperatures, but also the force of having large quantities of gaseous or liquid coolant pass between the fuel elements and through the spacer, as well as the vibrational forces of the fuel elements against the spacer structure. If the spacer cannot withstand these conditions, then the aforementioned problems of "hot spots" or loss of power output will occur, and possibly worse, the fuel elements could rupture causing leakage of the radioactive fuel into the coolant resulting in the contamination of the reactor. Unfortunately, most of the prior art spacer designs that are structurally adequate tend to cause "fretting" problems, i.e., wear on the fuel element due to vibration against the spacer, which can cause perforations to develop in the fuel element cladding. Another common problem among most of the prior art designs is the obstruction of the coolant flow along the fuel elements. This means less efficiency in removal of heat from the reactor core to the electrical generating equipment resulting in lower power output. Still another prior art spacer design problem centers around the fragility of the corner portions of the spacer design with regard to lowering and raising the fuel subassembly in the shroud when the fuel elements are being placed in or removed from the reactor core. In attempting to overcome these problems it is important to minimize the amount of neutron absorption material used in the spacer. Failure to do so results either in a reduction of reactor power output or a requirement for higher fuel enrichment (thus degrading the neutron deficiency of the reactor). Minimizing the neutron absorption material in the spacer has also been a problem with most prior art spacer designs.

SUMMARY OF THE INVENTION

It is an object of this invention to reduce and eliminate the above problems associated with prior spacer designs and to provide a spacer that will maintain the spatial integrity of the fuel elements with respect to one another while withstanding the reactor conditions through continued use.

These and other objects and advantages of this invention's spacer design will become apparent from the ensuing descriptions of the invention.

Accordingly, a spacer device is provided for maintaining the spatial integrity of the fuel elements during reactor operation. This spacer device comprises a peripheral support band having webbed corner members and improved scooped side members, intersecting support strips connected to the peripheral support band, and spring assemblies held in the desired positions by the support strips.

In another aspect of this invention the corner member comprises a support web and dimpled strips attached to connecting pieces in a manner to provide the corner member with about as much structural stability as a solid corner member, but with less neutron absorbing material. In turn, the connecting pieces are attached to the side members. In a more preferred embodiment the dimpled strips consist of an upper strip above the support web and a lower strip below the support web wherein the dimples in the upper strip are in vertical alignment with the dimples in the lower strip.

In a further aspect the side members are provided with improved coolant flow channels. The scoops have now been increased in size and all empty into a single cavity between the side member walls and the adjacent fuel elements. The top portion of the side member is now dimpled so that coolant can more easily flow through the cavity and so the adjacent fuel elements can be better supported in their fixed positions. Dimples are also provided below the scoop and positioned in vertical alignment with those in the top position for better coolant flow and fuel element support. In a more preferred embodiment the side members are provided with rubbing pads which minimize the contact of the spacer with the shroud, yet which still maintain the spatial integrity of the subassembly within the shroud.

In a still further aspect the support strips will be an intersecting combination of webbed support strips and single band strips. The webbed support strips comprise an upper and lower band joined by connecting columns, all appropriately matched to intersect other webbed support strips or single band strips which are also appropriately matched so that openings are formed for fuel element and coolant passage when intersection is made. In a more preferred feature the webbed support strip will be dimpled so that the dimples will extend into the openings formed. In a still more preferred embodiment the dimples will have small rounded protrusions which contact the fuel elements in the openings. In still another preferred embodiment the single band strips will be dimpled and these dimples will also possess the rounded protrusions. In a still further more preferred embodiment the dimples will be formed so that those adjacent to the projecting resilient means of the spring assembly and also projecting into the openings will not contact the fuel elements unless the resilient means is greatly depressed by the fuel elements.

In still another aspect the spring assembly will comprise four resilient means, at least one of which projects into a fuel element opening, attached to upper and lower support bodies which are held in place by the support strips. In a more preferred embodiment the resilient means comprises a major bend flanked by two minor bends of smaller radius. In still another preferred embodiment the spring assembly will be bimetallic whereby the non-resilient portion of the spring assembly can be composed of a very low neutron absorption material (i.e., zirconium, etc.) and the resilient means of a more resilient material (i.e., Inconel, etc.).

BRIEF DESCRIPTION OF THE DRAWINGS

FIG. 5A is a side elevation of an upper webbed support strip of a spacer device seen in FIG. 2.

FIG. 5B is a side elevation of a lower webbed support strip of a spacer device seen in FIG. 2.

FIG. 5C is a side elevation of an upper single band strip of a spacer device seen in FIG. 2.

FIG. 5D is a side elevation of a lower single band strip of a spacer device seen in FIG. 2.

PREFERRED EMBODIMENTS OF THE INVENTION

Figure 1:
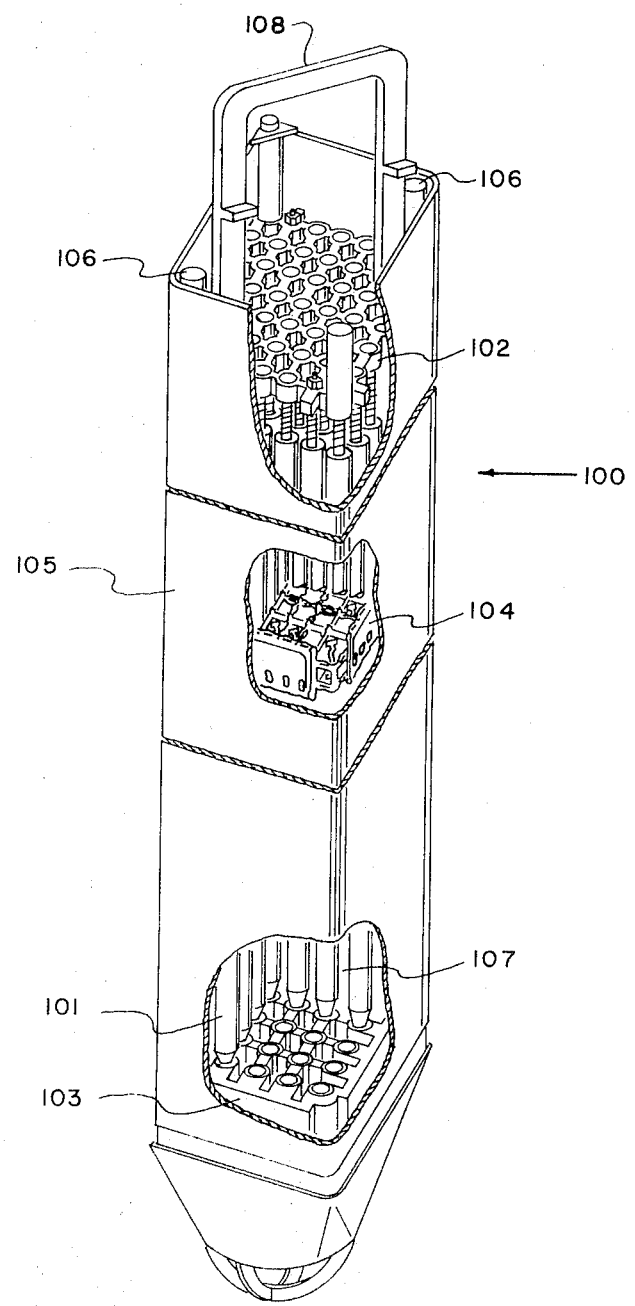
FIG. 1 is an isometric view, partly in section, of a fuel subassembly which utilizes the spacer device of this invention.

In a typical fuel subassembly, such as seen in FIG. 1, the fuel elements 101 are arranged in a vertical, parallel array. They are held in the desired position by an upper tie plate 102, a lower tie plate 103 and one or more spacer devices 104. The upper tie plate 102 may also be provided with a handle 108 which is used to raise and lower the fuel subassembly into the shroud. In turn the upper and lower tie plates may then be connected to the shroud by means such as special tie rods 106 which are bolted to the shroud as shown.

During operation a coolant material, such as water, flows generally upward from the lower tie plate through the openings or channels 107 between fuel elements 101, past the spacer device 104 and up through upper tie plate 102 and to a heat exchange zone (not shown) where the heat which the coolant acquired when flowing through the subassembly can be used to produce electricity. Because of the tremendous amount of heat generated from the fission reactions during reactor operation, the rate of water flow through channels 107 must be very large to remove the heat generated. This water flow thus places much stress on the components of spacer device 104.

Figure 2:
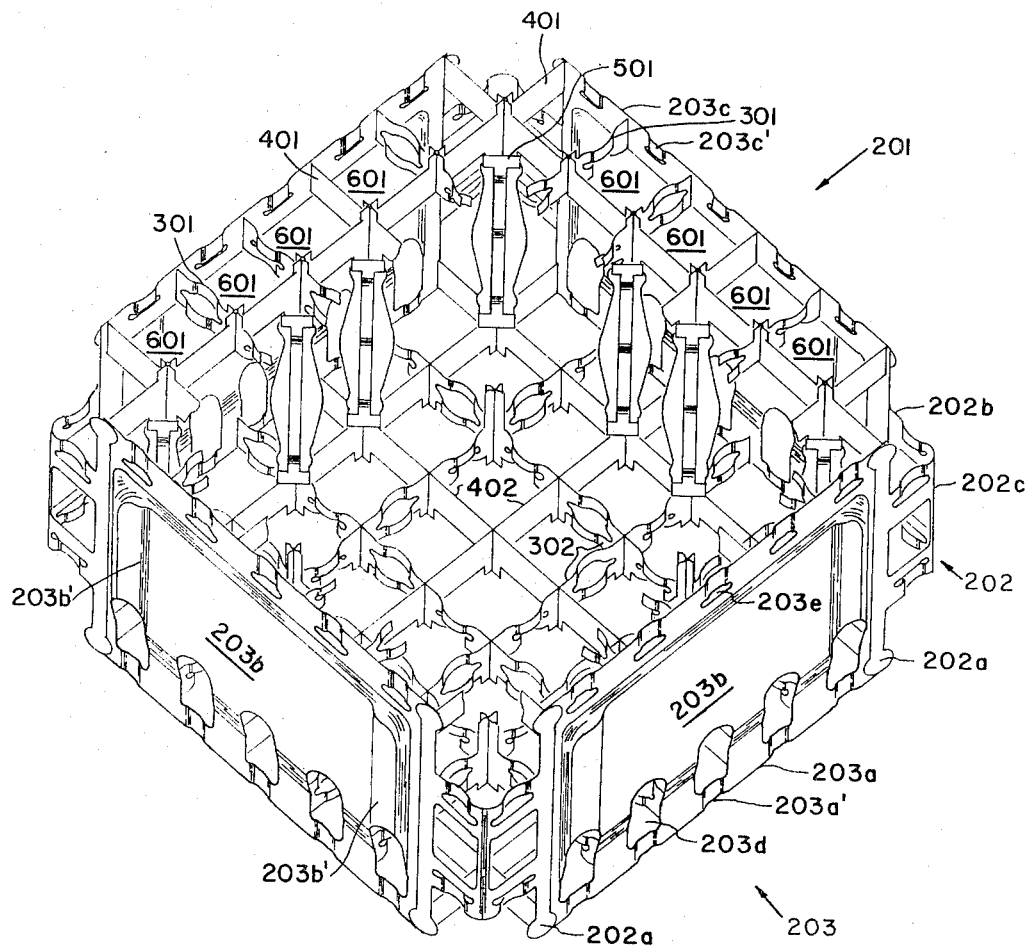
FIG. 2 is an isometric view of the spacer device of this invention.

As seen in FIG. 2 a spacer device of this invention comprises a peripheral support band 201 having webbed corner members 202 and improved scooped side members 203, intersecting support strips 301, 302, 401 and 402 which form openings 601, and spring assemblies 501.

Figure 3:
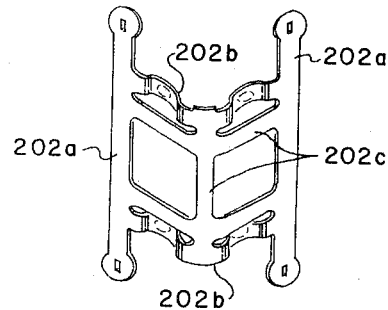
FIG. 3 is an isometric view of a corner member of the spacer device seen in FIG. 2.

In earlier prior art designs the corner piece of a spacer device had been a solid curved piece of metal or alloy connected to the side members. While such designs gave the support and stability necessary to survive the loading and unloading of the fuel subassemblies into the reactor, they had severe disadvantages, one of which is that they contained too much neutron absorbing material. In an effort to reduce the amount of material, single strip corner pieces were devised as seen in some of the prior art. These designs, however, are many times not structurally strong enough to withstand the jarring which takes place during loading and unloading of the fuel subassembly into the reactor. When this happens, the corner piece may break off, weakening the spacer device so that it will come apart during reactor operation. Another serious disadvantage with the single strap designs is that the corner fuel elements are not well supported by the corner piece. Applicants' dimpled, webbed corner member 202 reduces most of the prior art difficulties. Accordingly, as seen in FIG. 3, corner member 202 comprises connecting pieces 202a, dimpled strips 202b and support web 202c. The connecting pieces 202a are attached to the side members 203 (e.g., by welding), thus giving the spacer device its peripheral shape (i.e., square, parallelogram, etc.). A fuel element (not shown) located in opening 601 adjacent the corner member 202 is supported in two planes by the upper and lower dimpled strips 202b, extend inwardly to the adjacent opening and are open at the top and bottom. By supporting the fuel element in two separated planes, the rigidity to which the fuel element can be held is greatly increased. Another advantage of the corner member design of this invention is the use of support web 202c. This enables the amount of neutron absorbing material used to be greatly reduced while at the same time maintaining the structural strength at about the same as solid corner members of the same depth.

Returning to FIG. 2 it is seen that each side member 203 has a lower section 203a having dimples 203a', a raised outwardly middle displaced section 203b and an upper section 203c having dimples 203c'. Dimples 203a' project inward toward the center of the spacer device to the extent necessary to contact the fuel elements placed in openings 601 adjacent peripheral support band 201. Adjacent to and above each dimple 203a' there is a scoop 203d which forms openings to the raised middle section 203b. The middle section is raised outward from the center of the spacer device so as to form a large enough channel for easy coolant passage between the side member 203 and the fuel elements 101 adjacent side member 203. The middle section is also provided with rubbing pads 203b' (see FIGS. 2 and 8) which are outwardly displaced even further from the raised middle section 203b in order to contact the shroud (not shown). Good contact with the shroud is maintained, yet the contact surface area is minimized by positioning rubbing pads 203b' only at the ends of raised section 203b. This is beneficial in that good coolant flow can also be established between the raised middle section and the shroud. Another benefit is that there is less of a friction problem between the spacer and the shroud. In a most preferred embodiment the rubbing pads will be positioned adjacent to end scoops 203d allowing more coolant to flow between the fuel element adjacent side member 203. As in the lower dimpled section 203a, dimples 203c' also project inward toward the center of the spacer of the spacer device so as to contact the fuel elements 101 placed in openings 601 adjacent the peripheral support band 201. In doing so, dimples 203c' form exiting scoops 203e through which coolant can smoothly pass.

In a most preferred embodiment, both dimples 203a' and 203c' will extend inward to the same degree.

Figure 4:
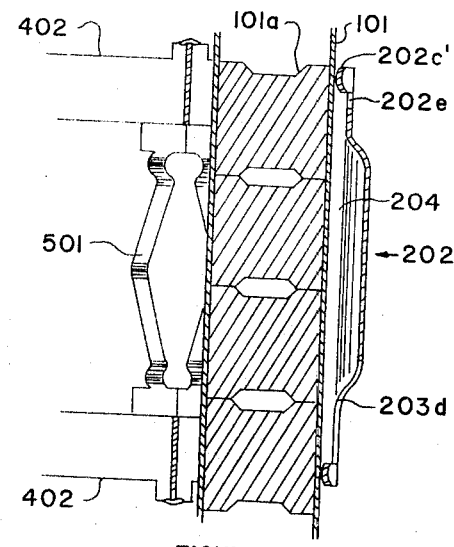
FIG. 4 is a side elevation taken along line 6—6 of FIG. 8 which shows the side member of the spacer device in relationship to the fuel elements.

Turning now to FIG. 4, the advantages of the side member design over that of the prior art becomes clear. The fuel material 101a within fuel element 101 generates heat which is passed to the surroundings. If this heat is not removed efficiently, not only will the power producing efficiency of the reactor core be lowered, but also large thermal stresses will be placed on the spacer device components near the fuel element 101. In time, serious structural deterioration of the spacer device could take place. According to applicants' invention, the upwardly flowing coolant can easily enter through bottom scoops 203d formed between inwardly protruding dimples 203a and outwardly raised side 203b into the channel 204 where heat generated can be transferred to the coolant which can then exit smoothly through the exit scoops 202e created by dimples 202c'. This design thus eliminates the structural impendances found in the prior art while at the same time serving as a positioning structure for the fuel elements adjacent side member 202.

In a preferred embodiment the support strips consist of intersecting webbed support strips 301 and 302 as seen in FIGS. 5A and 5B and single band strips 401 and 402 as seen in FIGS. 5C and 5D. Referring now in particular to FIG. 5A, webbed support strip 301 comprises an upper band 301a, a lower band 301b and a column 301c connecting both bands to form a web structure. In more detail upper band 301a is provided with notches 301a' which receive and intersect corresponding notches in other support strips in a manner described more particularly below. The lower band 301b is also provided with notches 301b' which provide a similar function as notches 301a'. Likewise column 301c is cut with notch 301c'. FIG. 5B illustrates a webbed support strip 302 that can be used to intersect the support strip shown in FIG. 5A. The FIG. 5B support strip 302 is very similar to the FIG. 5A support strip 301 in that it too has an upper band 302a having notches 302a', a lower band 302b having notches 302b' and columns 302c having notches 302c'. The difference between the two is in the position of the column notches 301c' and 302c'. Notch 301c' is cut from the lower band 301b while notch 302c' is cut from the upper band 302a. In this manner the two webbed strips can intersect one another as more clearly described below. FIGS. 5C and 5D show an upper single band strip 401 and a lower single band strip 402, respectively. Strip 401 is provided with tabs 401a which when intersected with other support strips with corresponding tabs secure spring assembly 501 in position as described below. The tabs 401a have notches 401a' cut in their lower portion. There are also notches 401b cut into the lower portion of strip 401. Strip 402 is similar to strip 401 in that notches 402b are also cut into the lower portion, but different in that tabs 402a have notches 402a' cut into their upper portion.

Although FIGS. 5C and 5D do not show strips 401 and 402 as being dimpled they can be if desired.

Figure 6:
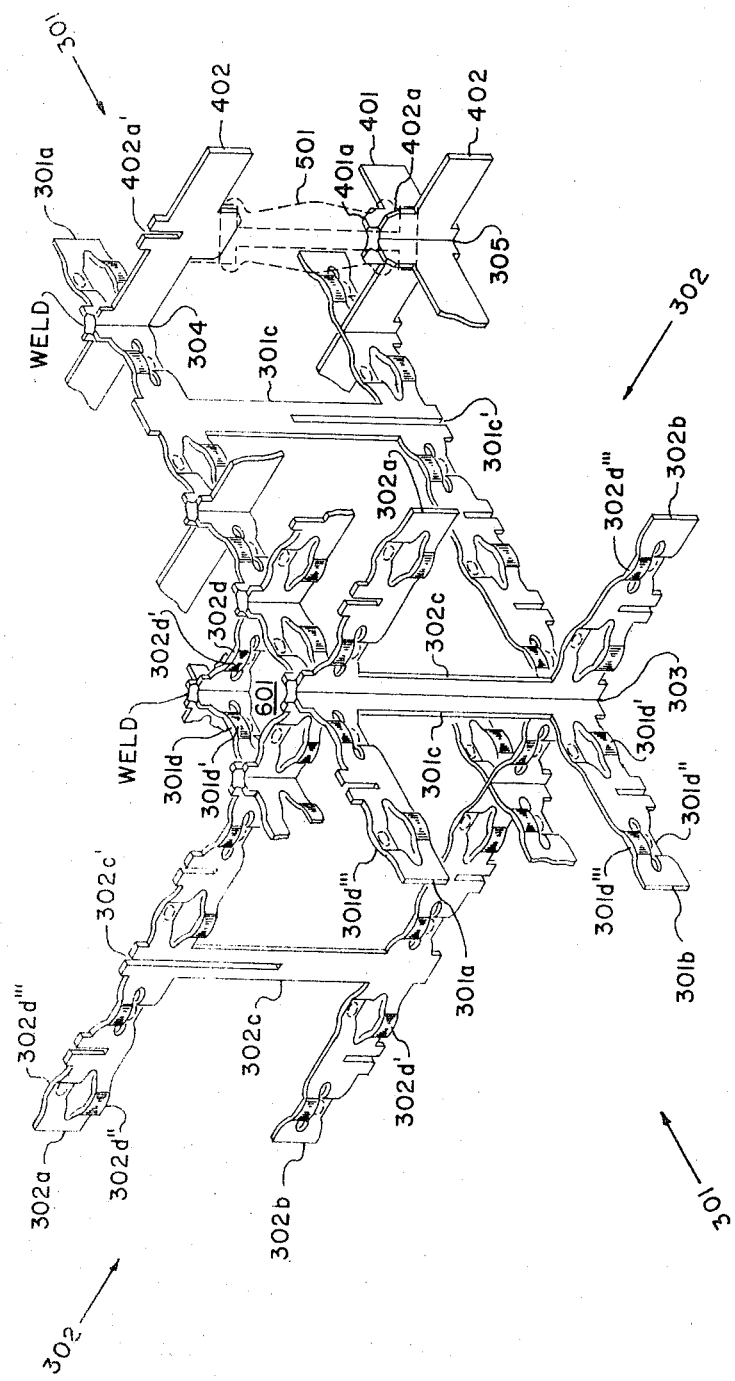
FIG. 6 is an isometric view, partly in section, of a piece of the intersecting support strips.

Looking now at FIG. 6 the manner in which these support strips can be intersected to form openings 601 is more clearly illustrated. First the intersection of webbed strip 301 with webbed strip 302 at position 303 can be seen. At this position notch 302c' of strip 302 slips into notch 301c' of strip 301 so that the strips intersect perpendicularly to one another. When the notches are of the same depth, as is preferred, strips 301 and 302 will intersect flushly and can be easily welded together. In a similar manner lower single band strip 402 perpendicularly intersects upper webbed strip 301a at position 304 by slipping notch 402b into notch 301a' and welding them together. As before, the notches are preferably of the same depth for flush fitting and easier welding.

Also shown in FIG. 6 is the intersection of upper single band strip 401 with lower single band strip 402 at position 305 wherein tabs 401a and 402a form a locking device to hold spring assembly 501 (dotted lines) securely in position.

The webbed support strips 301 and 302 are also provided with dimples 301d and 302d having upper portions 301d''' and 302d''', as well as, lower portions 301d'' and 302d'' which protrude into openings 601. In a more preferred embodiment each dimple will have a small, rounded rise 301d' and 302d' that extends further into opening 601. In this manner contact of the support strips and the fuel element is kept to a minimum resulting in a reduction of fretting problems.

Figure 7:
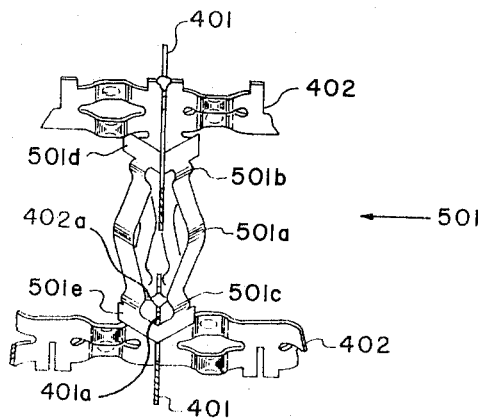
FIG. 7 is an isometric view of the spring assembly and capture in a spacer device seen in FIG. 2.

The spring assembly is more clearly seen in FIG. 7. The spring assembly 501 is captured from the top by the tabs 401a and 402a which jut down from upper and lower single band strips 401 and 402 (shown with dimples) and from the bottom by the tabs 401a and 402a which jut up from upper and lower single band strips 401 and 402 (shown with dimples). The tabs fit into the upper and lower corners of the upper and lower boxed shaped portions 501d and 501e of spring assembly 501, respectively, preventing the spring assembly from rotating in position. The spring assembly 501 has four spring members, each of which has a major bend 501a flanked by two minor bends 501b and 501c. At least one of the major bends 501a extends into opening 601 and contacts fuel element 101 (not shown). As bend 501a is depressed in toward the spring assembly 501 by the fuel element 101, part of the force in bend 501a is translated to bends 501b and 501c thus enabling bend 501a to maintain its resiliency for a longer time period. Bends 501b and 501c are further designed (smaller radius of curvature than bend 501a) to have less flexibility. Thus, these two bends will contact and offer a great force against fuel element 101 when it depresses bend 501a too far. This counterforce prevents too large a force from being placed on bend 501a which, in turn, helps prevent the spring portion from breaking off. This also helps bend 501a to retain its resiliency.

Figure 8:
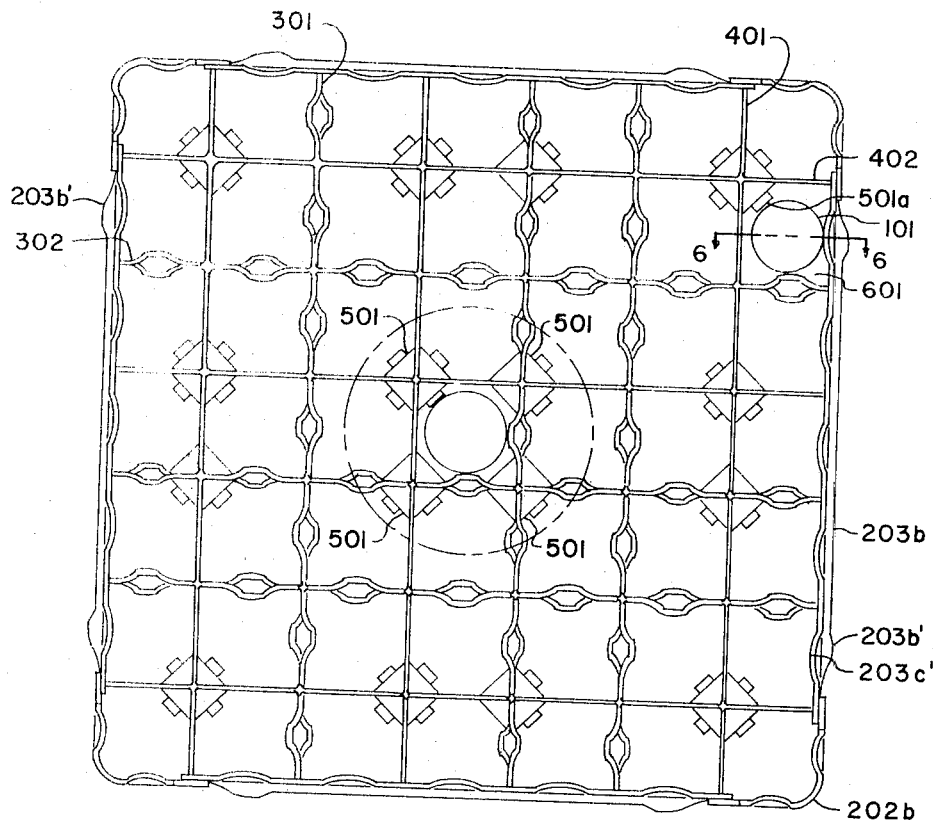
FIG. 8 is a top view of a spacer device as seen in FIG. 2.
Figure 9:
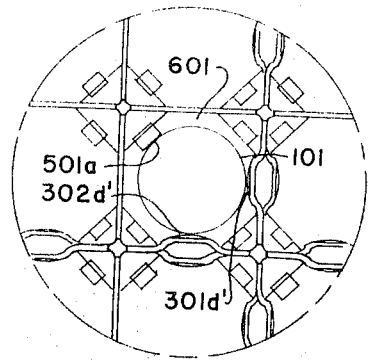
FIG. 9 is an enlarged section of the center portion of FIG. 8 enclosed along the dashed lines.

FIG. 8 is a top view of a spacing device assembled according to this invention. A fuel element 101 fits into each opening 601 and is held in place against dimples by the spring force of bend 501a on it. This is seen more clearly in FIG. 9 which is an enlargement of the center portion FIG. 8. A preferred embodiment fuel element 101 only touches spherically projecting portions 301d' and 302d'. FIG. 9 also illustrates another unique feature of this invention's spring assembly. Bend 501a can be either projecting outward toward opening 601 in order to contact fuel element 101 or projecting inward toward the spring assembly. The upper and lower right spring assemblies are "one-leaf" assemblies, i.e., having only one bend 501a projecting in opening 601. On the lower left is a "two-leaf" assemblies, i.e., having two bends 501a projecting into different openings 601. Finally, a "four-leaf" assembly is shown at the upper left of FIG. 9. This unique spring assembly design allows much greater ease in construction and assembly of the spacing device, while at the same time offering greater design flexibility than is seen in the prior art.

In another preferred feature both the single band structures and the webbed strips will be dimpled so that when they intersect the dimples adjacent to the resilient means protruding into openings can serve as "backup" dimples, i.e., they do not contact the fuel element until the resilient means has been depressed. In this manner they can prevent the resilient means from breaking or from rapidly losing its resiliency, because they limit the amount of depressment the resilient means undergo.

There are of course many obvious alternates to the above spacing device which fall within this invention.

Having described and illustrated our invention, what we claim as new, useful, novel and unobvious, and desire U.S. Letters Patents is:

1. A spacer device for maintaining the spatial integrity of fuel elements assembled in a nuclear reactor subassembly and having fuel element openings at least at the corners thereof which comprises:
   a. a peripheral support band comprising corner means having an open webbed configuration consisting of vertical and horizontal interconnected members and including spaced dimples which are open at the top and bottom thereof and extend into said openings in spaced relation relative to said members and side means adjacent thereto, said corner means being attached to said side means, said side means including an outward raised middle section having openings in the lower portion thereof leading to a cavity formed by said raised middle section;
   b. upper and lower support strips attached to said peripheral support band and intersected to form said fuel element openings within said peripheral support band; and
   c. elongated spring assemblies captured internally at opposite ends thereof by said upper and lower support strips respectively where at least some of said support strips intersect, said support strips located externally at opposite ends of said spring assemblies.

2. A spacer device according to claim 1 wherein each of said webbed corner means comprises upper and lower horizontal strips having laterally spaced inward extending dimples, and at least one vertical support member interconnecting said upper and lower strips.

3. A spacer device according to claim 2 wherein said upper strip dimples are in substantial vertical alignment with corresponding lower strip dimples.

4. A spacer device for maintaining the spatial integrity of fuel elements assembled in a nuclear reactor subassembly and having fuel element openings at least at the corners thereof which comprises:
   a. a peripheral support band comprising substantially open webbed corner means including interconnected horizontal and vertical members with spaced dimples open at the top and bottom thereof and side means secured adjacent to said corner means, wherein said side means comprises a lower section, an upper section having inward protruding dimples open at the top and bottom thereof and an outward raised middle section connected to said lower and upper sections extending for substantially the full length of said side means and having openings only in the lower portion of said middle section leading to a single cavity formed by said middle section's raised portion;
   b. intersecting support strips attached to said peripheral support band forming said fuel element openings within said peripheral support band; and
   c. spring assemblies captured internally at opposite ends by said support strips where at least some of said support strips intersect, said support strips located externally at opposite ends of said spring assemblies.

5. A spacer device according to claim 4 wherein said lower section has dimples located below said openings in the lower portion of said middle section, corresponding ones of said upper and lower section dimples being vertically aligned and extending into said openings formed by said intersecting support strips adjacent said side means, and each of said dimples being open at the top and bottom thereof and extending inward relatively to said raised middle section.

6. A spacer device according to claim 4 wherein said lower section includes dimples adjacent and opening into said openings in said middle section.

7. A spacer device for maintaining the spatial integrity of fuel elements assembled in a nuclear reactor subassembly which comprises:
   a. a peripheral support band comprising corner means having an open webbed configuration consisting of verticle and horizontal interconnected members with spaced dimples open at the top and bottom thereof, said corner means being attached to side means, said side means comprising a lower section, an upper section and an outward raised middle section connected to said lower and upper sections extending for substantially the full length of said side means and having openings in the lower portion of said middle section leading to a cavity formed by said raised middle section;
   b. webbed, slotted substantially open support strips attached and perpendicular to said peripheral support band, each of said support strips comprising an upper band member having spaced pairs of oppositely protruding vertically aligned dimples, a lower band member having spaced pairs of oppositely protruding vertically aligned dimples, corresponding pairs of said dimples on said lower and upper bands being vertically aligned, and column means interconnecting said upper band with said lower band;
   c. single separate band strips attached to said peripheral support band and intersected with predetermined slots in said support strips to form openings within said peripheral support band through which said fuel elements can pass; and d. spring assemblies captured for endwise restraint at predetermined ones of the intersections of said strips.

8. A spacer device according to claim 7 wherein said dimples extend into said openings and have rounded protrusions at their outermost extended portion to provide for point contact with an adjacent one of the fuel elements when it is located in said opening.

9. A spacer device according to claim 1 wherein each of said spring assemblies comprises at least one resilient means extending into said opening so as to contact said fuel element when it is located in said opening and selected ones of said spring assemblies include only one resilient means extending into an adjacent opening and said dimples adjacent to said resilient means and extending into said adjacent opening are constructed and arranged to limit the amount of depression of said resilient means.

10. A spacer device for maintaining the spatial integrity of fuel elements assembled in a nuclear reactor subassembly which comprises:

a. a continuous peripheral support band, comprising corner means having an open webbed configuration consisting of verticle and horizontal interconnected members with spaced dimples open at the top and bottom thereof, said corner means being attached to side means, said side means including an outward raised middle section having openings in the lower portion thereof leading to a cavity formed by said raised middle section;

b. intersecting support strips attached to said peripheral support band forming openings within said peripheral support band through which said fuel elements can pass; and c. spring assemblies captured internally for endwise restraint by said support strips and held in position where at least some of said support strips intersect, said support strips being located externally at opposite ends of said spring assemblies, predetermined ones of said spring assemblies comprising four resilient spring means attached to upper and lower relatively rigid means in a position where each of said resilient spring means will be opposite another of said resilient spring means in different openings, and wherein only those resilient means that contact said fuel elements when located in said openings extend therein.

11. A spacer device according to claim 9 wherein further selected ones of said spring assemblies include only two resilient means extending into adjacent openings.

12. A spacer device according to claim 9 wherein further selected ones of said resilient means include four resilient means extending into adjacent openings.

13. A spacer device according to claim 9 wherein first ones of said resilient means include only one resilient means extending into adjacent openings, second ones of said spring assemblies include only two resilient means extending into adjacent openings, and third ones of said spring assemblies include four resilient means extending into adjacent openings.

* * * * *